(12) United States Patent
Noda

(10) Patent No.: US 10,237,101 B2
(45) Date of Patent: Mar. 19, 2019

(54) RECEIVING DEVICE

(71) Applicant: MITSUBISHI ELECTRIC CORPORATION, Tokyo (JP)

(72) Inventor: Yasunori Noda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/065,465

(22) PCT Filed: Feb. 22, 2016

(86) PCT No.: PCT/JP2016/054982
§ 371 (c)(1),
(2) Date: Jun. 22, 2018

(87) PCT Pub. No.: WO2017/145215
PCT Pub. Date: Aug. 31, 2017

(65) Prior Publication Data
US 2019/0028309 A1 Jan. 24, 2019

(51) Int. Cl.
*H04L 27/22* (2006.01)
(52) U.S. Cl.
CPC .................. *H04L 27/22* (2013.01)
(58) Field of Classification Search
CPC .......................................... H04L 27/22
(Continued)

(56) References Cited

U.S. PATENT DOCUMENTS 6,437,734 B1 * 8/2002 McBurney ............ G01S 5/0018
342/357.62
7,375,682 B1 * 5/2008 Tester .................... G01S 19/24
342/357.63
(Continued)

FOREIGN PATENT DOCUMENTS

JP 2013-46382 A 3/2013
JP 2014-60616 A 4/2014
(Continued)

OTHER PUBLICATIONS

Hoshihara et al., "Separation and detection of collided packets for space based automatic identification system experiments", IEICE Technical Report RCS2014-305 (Mar. 2015), pp. 23-28.

*Primary Examiner* — Michael R Neff
(74) *Attorney, Agent, or Firm* — Birch, Stewart, Kolasch & Birch, LLP

(57) ABSTRACT

A receiving device according to the present invention includes: a search range control unit that determines, for a reception signal including a plurality of wireless signals partially overlapping on at least one of a time axis and a frequency axis and received by a moving object, a search range for the plurality of wireless signals in a search space including the time axis and the frequency axis based on information on position and velocity of the moving object; a time frequency detection unit that generates information on time and frequency at which a wireless frame included in each of the plurality of wireless signals is received in the search range for the reception signal determined by the search range control unit; and a detection unit that demodulates the reception signal to acquire the wireless frame based on the information on time and frequency generated by the time frequency detection unit.

8 Claims, 5 Drawing Sheets

(58) Field of Classification Search
USPC .......................................................... 375/340
See application file for complete search history.

(56) References Cited

U.S. PATENT DOCUMENTS

| | | |
|---|---|---|
| 2002/0123352 A1* | 9/2002 | Vayanos ................. G01S 19/05 455/456.1 |
| 2007/0275734 A1 | 11/2007 | Gaal et al. |
| 2011/0223936 A1 | 9/2011 | Altintas et al. |
| 2012/0038510 A1 | 2/2012 | Gaal et al. |
| 2012/0040668 A1 | 2/2012 | Gaal et al. |
| 2012/0040689 A1 | 2/2012 | Gaal et al. |
| 2012/0220294 A1 | 8/2012 | Gaal et al. |
| 2013/0121246 A1 | 5/2013 | Guey et al. |
| 2015/0236764 A1 | 8/2015 | Fujii |

FOREIGN PATENT DOCUMENTS

| | | |
|---|---|---|
| JP | 5507642 B2 | 5/2014 |
| JP | 5628248 B2 | 11/2014 |
| JP | 2015-502066 A | 1/2015 |
| JP | 2015-162873 A | 9/2015 |
| WO | WO 2010/067777 A1 | 6/2010 |

* cited by examiner

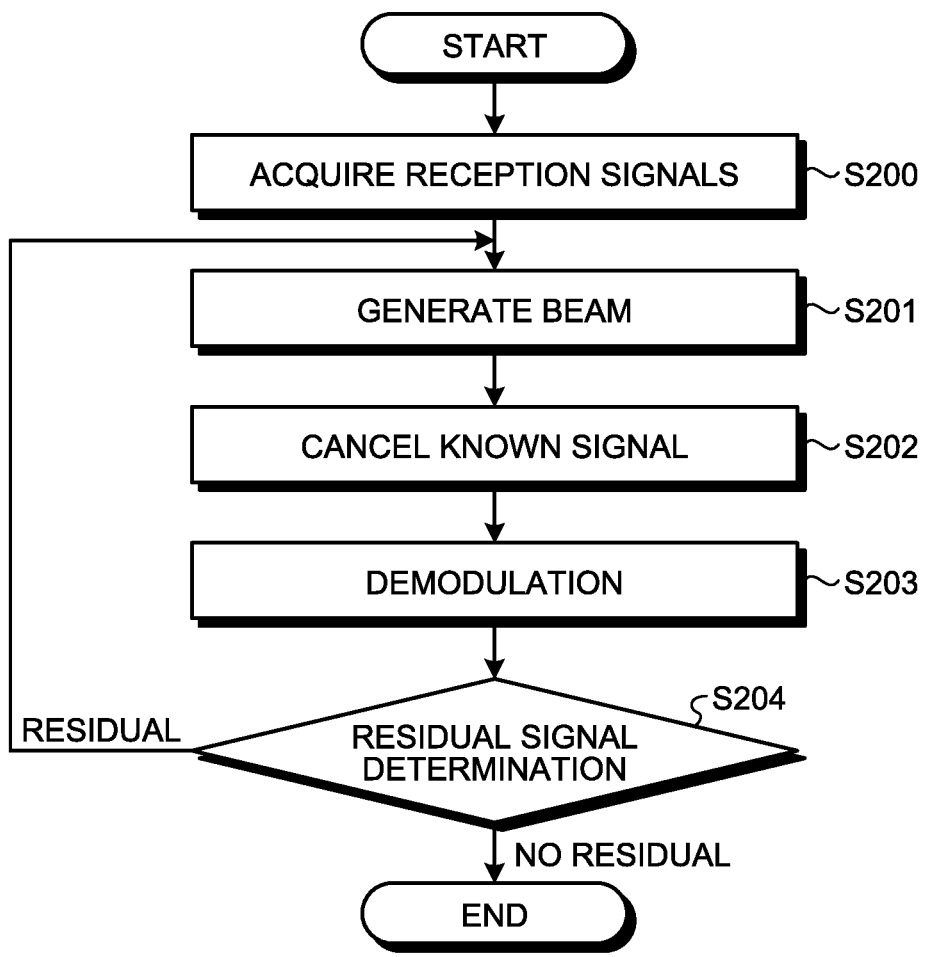

RECEIVING DEVICE

FIELD

The present invention relates to a receiving device that receives wireless signals, and more particularly to a demodulation technique for a receiving device that receives a plurality of transmission signals transmitted wirelessly from transmitting devices and overlapping on a time or frequency axis.

BACKGROUND

In order to correctly demodulate a wireless signal received by a receiving device in a wireless communication system, it is generally necessary to perform synchronization of the frequency and time (symbol timing, frame timing, etc.) of a received wireless signal. If the received wireless signal undergoes some interference, a technique for demodulating the reception signal including an interference component is required. Examples of receiving techniques which are effectively used when a plurality of wireless reception signals, which are reception targets, having the same signal format overlaps on a time or frequency axis to cause interference, include a method (first technique) of performing interference cancellation typified by successive interference cancellation (SIC) used for bell laboratory layered space-time (BLAST) or the like in multiple input multiple output (MIMO) and a method (second technique) of performing maximum likelihood estimation on all overlapping signals.

The first technique and the second technique are kinds of synchronous detection methods applicable when the frequency and time of transmitted wireless signals are obtained with some synchronization method. The first technique requires frequency and time information for generating a replica from a demodulation result even when differential transmission signals are demodulated using asynchronous detection.

A synchronization technique for Gaussian-filtered frequency shift keying (GFSK) or Gaussian-filtered minimum shift keying (GMSK) signals is disclosed as a technique for estimating the frequency and time of a wireless reception signal when interference occurs (Patent Literature 1). However, Patent Literature 1 does not disclose a method of estimating the time and frequency of each of a plurality of wireless reception signals when the plurality of wireless reception signals interferes with each other. For example, in a case where a receiving device that is mounted on a moving vehicle, an aircraft, a satellite, or the like (hereinafter collectively referred to as a moving object) receives signals transmitted from a plurality of transmitting devices that shares a frequency band with each other but having time axial shifts or frequency axial shifts that are not necessarily the same, a plurality of transmission signals interferes with each other, and it is necessary to estimate the time and frequency of each transmission signal in order to receive the interfered signals. Examples of methods that can be used in such a case include: a method of performing correlation processing by using a synchronization signal such as a preamble and adding time and frequency shifts to the synchronization signal, and obtaining the time and frequency at which a peak is given as an estimation result; and a method of using a sparse coding technique such as orthogonal matching pursuit (OMP) to obtain time, frequency, and payload information as bases, and selecting some bases from a dictionary which is a set of them to obtain a time and frequency estimation result.

CITATION LIST

Patent Literature

Patent Literature 1: Japanese Patent Application Laid-open No. 2013-46382

SUMMARY

Technical Problem

The above-described time and frequency estimation techniques for conventional receiving devices thus have the following problem: in a case where a plurality of transmission signals that are interfered to each other is received, a large amount of calculation is required to estimate the time and frequency with a resolution that does not cause performance degradation through demodulation from a two-dimensional search space including time and frequency axes. This problem is remarkable especially in a communication environment where a moving object moves at high velocity to make the Doppler frequency shift dominant in the frequency deviation. This is because the search space expands in such a communication environment.

The present invention has been made to solve the above problem, and an object thereof is to obtain a receiving device that receives a plurality of wireless signals that are interfered to each other and reduces the amount of calculation required for estimating the time and frequency of each wireless reception signal.

Solution to Problem

A receiving device according to an aspect of the present invention includes: a search range control unit to determine, for a reception signal including a plurality of wireless signals partially overlapping on at least one of a time axis and a frequency axis and received by a moving object, a search range for the plurality of wireless signals in a search space including the time axis and the frequency axis based on information on position and velocity of the moving object; a time frequency detection unit to generate information on time and frequency at which a wireless frame included in each of the plurality of wireless signals is received in the search range for the reception signal determined by the search range control unit; and a detection unit to demodulate the reception signal to acquire the wireless frame based on the information on time and frequency generated by the time frequency detection unit.

Advantageous Effects of Invention

According to the present invention, even when a plurality of wireless signals arrives with an unknown deviation on a time or frequency axis, time and frequency are narrowed down, so that time and frequency intervals calculated with an evaluation function can be appropriately controlled. Thus, it is possible to reduce the amount of calculation required for estimating time and frequency.

BRIEF DESCRIPTION OF DRAWINGS

FIG. 8 is a flowchart illustrating an exemplary processing flow of the receiving device according to the second embodiment of the present invention.

DESCRIPTION OF EMBODIMENTS

Figure 1:
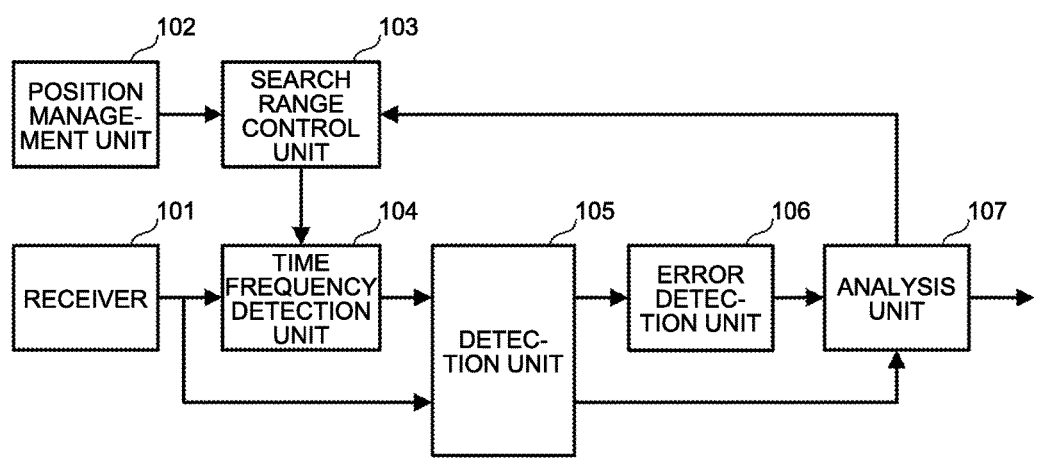
FIG. 1 is a block diagram illustrating an exemplary functional configuration of a receiving device according to a first embodiment of the present invention.

Hereinafter, modes for carrying out the present invention will be described with reference to the drawings. In the drawings referred to below, identical or corresponding parts are denoted by the same reference signs.

First Embodiment

FIG. 1 is a block diagram illustrating an exemplary functional configuration of a receiving device according to a first embodiment of the present invention. A receiver 101 is an instrument including an antenna (not illustrated) that receives a wireless signal transmitted by a transmitting device. The receiver 101 receives a wireless signal, generates and outputs a reception signal that is an electric reception signal. It should be noted that the receiver 101 may perform, for example, a process of converting a radio frequency (RF) signal of a wireless frequency band received by the antenna into a baseband signal, which is performed by a general wireless signal receiving device, and may output the baseband signal. Here, it is assumed that the receiver 101 outputs, as a reception signal, a data string sampled at a sampling rate sufficient for reproducing a signal with a Doppler-shifted frequency or the like.

A position management unit 102 manages information on the position of a moving object (position information) and information on the velocity of a moving object (velocity information). The position information and the velocity information can be obtained from information acquired from the global positioning system (GPS) or an inertial navigation device, for example. The position management unit 102 also processes information on the directivity of the receiving antenna of the receiver, the position information, and the velocity information so as to generate narrowing-down information associated with the data string of the reception signal for use in narrowing down time and frequency. A search range control unit 103 controls a time and frequency search space by using analysis information output by an analysis unit 107 (described later) in addition to the geographical narrowing-down information that is generated by the position management unit 102.

A time frequency detection unit 104 generates an evaluation function $g(\tau, f)$ related to time variable $\tau$ and frequency variable f, and generates, from this result, information on the time and frequency of each of a plurality of transmission signals included in the reception signal (time frequency information). A detection unit 105 demodulates the signals corresponding to the plurality of transmission signals superimposed on the reception signal based on the reception signal output by the receiver 101 and the time frequency information output by the time frequency detection unit 104, and outputs the demodulated signals.

An error detection unit 106 performs error detection processing on each of the demodulated signals. The data analysis unit 107 analyzes the demodulated signals which have undergone the error detection processing, and outputs the analysis result (analysis information) to the search range control unit 103. The data analysis unit 107 also outputs, as reception data, the demodulated signals subjected to the error detection processing.

Figure 2:
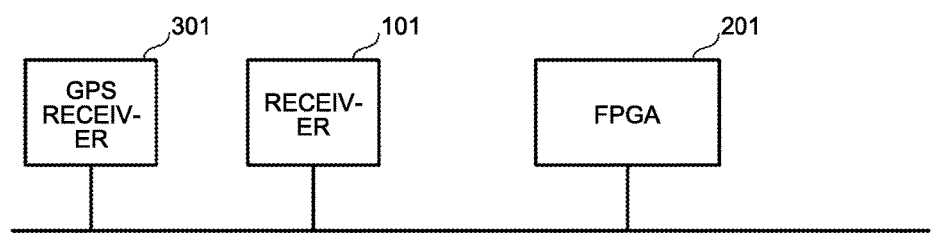
FIG. 2 is a block diagram illustrating an exemplary hardware configuration of the receiving device according to the first embodiment of the present invention.

FIG. 2 is an exemplary configuration of the receiving device according to the present embodiment which is realized by dedicated hardware such as a field programmable gate array (FPGA) or an application specific integrated circuit (ASIC). In FIG. 2, the position management unit 102, the search range control unit 103, the time frequency detection unit 104, the detection unit 105, the error detection unit 106, and the analysis unit 107 are realized by the FPGA 201. In FIG. 2, a GPS receiver 301 is also illustrated as an example of an instrument for acquiring position information that is used by the position management unit 102. Since the present invention does not specify a method of acquiring position information as described above, it is also possible to use another means. The receiver 101 is a wireless signal receiver including an antenna.

Figure 3:
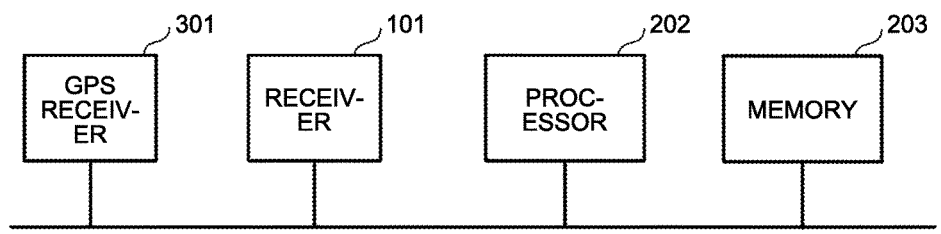
FIG. 3 is a block diagram illustrating an exemplary hardware configuration of the receiving device according to the first embodiment of the present invention.

FIG. 3 is an exemplary configuration of the receiving device according to the present embodiment which is realized by using a processor and a program executed on the processor. The functions of the position management unit 102, the search range control unit 103, the time frequency detection unit 104, the detection unit 105, the error detection unit 106, and the analysis unit 107 are configured by a program, and the processor 203 executes the program stored in a memory 202. The memory 202 is also used as a work area of the processor 203. In addition to the configurations illustrated in FIGS. 2 and 3, various configurations including combinations of software and dedicated hardware can be used.

It should be noted that the receiving device of the present invention does not necessarily need to be mounted on a moving object. The receiver 101 may be separated, and a signal output from the receiver 101 mounted on a moving object may be transferred to a receiving device which is another device by some means (wireless communication, wired communication, radio on fiber (RoF), combinations thereof, etc.) to be input to the time frequency detection unit 104. Similarly, the position management unit 102 may be configured to be separated from the receiving device of the present invention, except functions required to be performed in a moving object, such as a GPS receiver for acquiring the current position and velocity using the GPS, for example. In a case where the receiving device of the present invention is not mounted on a moving object that actually acquires a reception signal, when time synchronization needs to be established between position information or information on the directivity of the receiving antenna acquired by the position management unit 102, which fluctuates with the lapse of time, and a signal acquired by the receiver 101, a process of attaching time stamps to both of them may be performed, for example.

Figure 4:
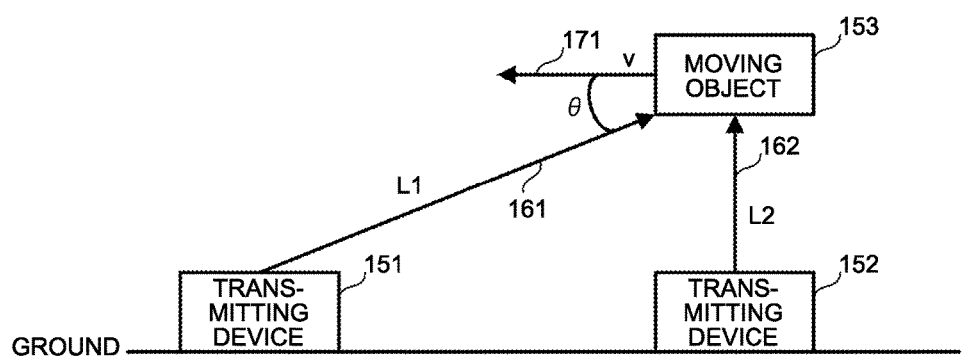
FIG. 4 is a schematic diagram for explaining reception of wireless signals in the receiving device according to the first embodiment of the present invention.

Next, the operation of the receiving device according to the present embodiment will be described. As illustrated in FIG. 4, the following example describes a case where a transmitting device 151 and a transmitting device 152 that are located on the ground asynchronously transmit wireless signals with a shared frequency to a moving object 153 moving in the sky. The moving object 153 includes the receiving device according to the present embodiment, and receives the signals transmitted by the transmitting device 151 and the transmitting device 152. At this time, because the transmitting device 151 and the transmitting device 152 asynchronously transmit the signals, the signals transmitted by the transmitting device 151 and the transmitting device 152 and received by the receiving device of the moving object 153 can overlap each other on the time axis. Even when the transmitting device 151 and the transmitting device 152 transmit signals using different slots allocated to the transmitting devices 151 and 152 in accordance with a time division multiple access (TDMA) method, because the signals arrive at the moving object through different paths as indicated by arrows 161 and 162 in FIG. 4, different propagation delays that depend on the path lengths (L1 and L2) are generated, so that the signals from the two transmitting devices may partially overlap each other on the time axis.

In a case where the positional relationship between the moving object 153 and the transmitting device 151 and the positional relationship between the moving object 153 and the transmitting device 152 are different, different Doppler frequency shifts occur in the wireless signals transmitted from the transmitting device 151 and the transmitting device 152. For example, in FIG. 4, suppose the moving object 153 is moving at velocity v in the direction indicated by arrow 171, and suppose the angle between the line segment (corresponding to arrow 161) connecting the moving object 153 and the transmitting device 151 and the traveling direction (arrow 171) of the moving object 153 is θ. At this time, the velocity contributing to the Doppler phenomenon for the transmitting device 151 and the moving object 153 is v cos θ. Here, assuming that the moving object 153 is present in the vertical direction of the transmitting device 152, the signal transmitted by the transmitting device 151 has a Doppler frequency shift of zero or more while the signal transmitted by the transmitting device 152 has a Doppler frequency shift of zero. Therefore, a frequency deviation obtained from a frequency shift component due to the Doppler phenomenon and from a frequency shift derived from an oscillator used by a transmitting device is added to a wireless signal arriving at the moving object. In this manner, because different frequency shifts occur in a plurality of wireless signals, the plurality of wireless signals can partially overlap each other on the frequency axis.

Figure 5:
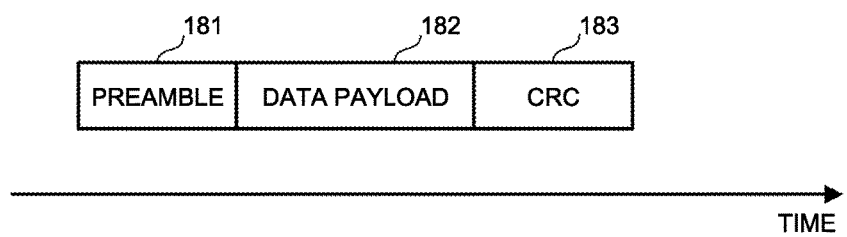
FIG. 5 is a block diagram illustrating an exemplary configuration of a frame that is received by the receiving device according to the first embodiment of the present invention.

FIG. 5 is a diagram illustrating an exemplary configuration of a wireless frame (transmission data) that is transmitted by the transmitting device 151 or the transmitting device 152. It is assumed that the wireless frame includes a preamble 181, a data payload 182, and an error detection code 183 as illustrated in FIG. 5. In the example of FIG. 5, a cyclic redundancy check (CRC) is used as the error detection code. The following example describes a case where data with the structure illustrated in FIG. 5 are transmitted in a burst signal that lasts for a relatively short time in accordance with a Gaussian-filtered minimum shift keying (GMSK) modulation method. However, the present invention is not limited to these frame configuration and modulation method.

Figure 6:
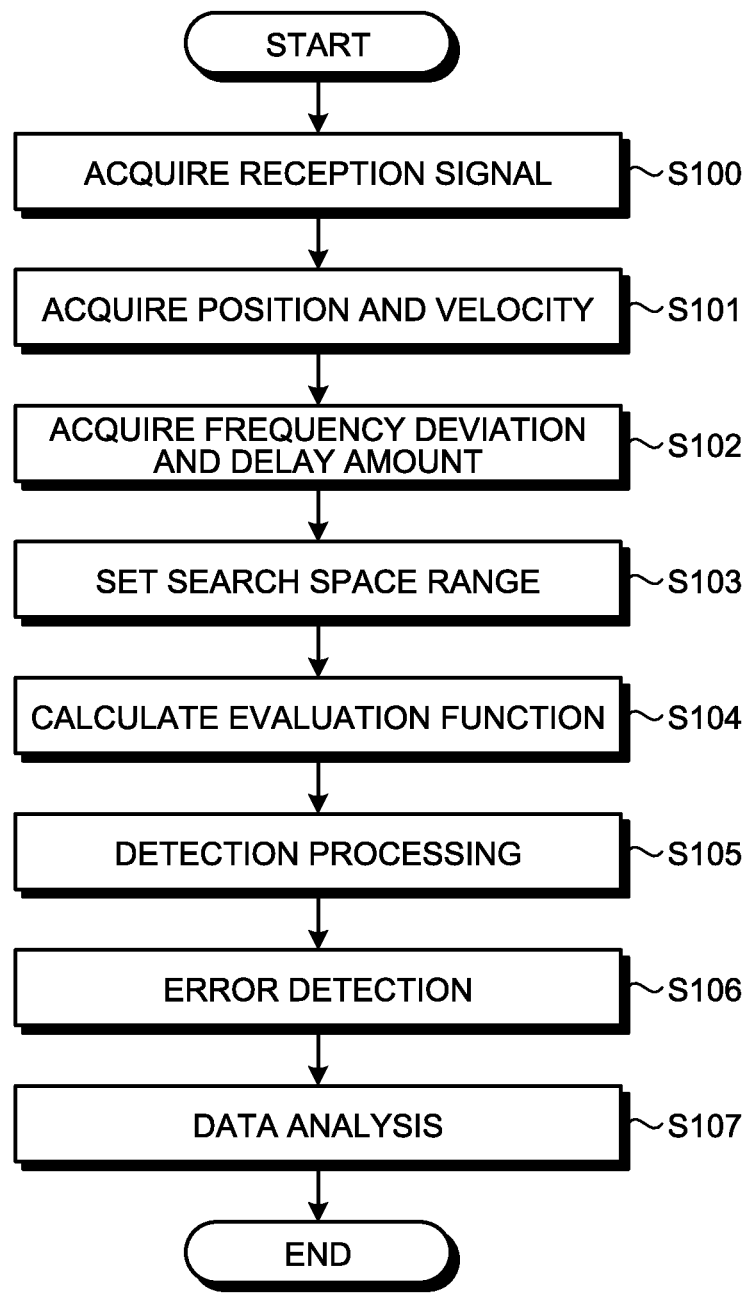
FIG. 6 is a flowchart illustrating an exemplary processing flow of the receiving device according to the first embodiment of the present invention.

FIG. 6 is a flowchart illustrating an exemplary processing flow of the receiving device according to the present embodiment. Note that the receiving device according to the present embodiment is not limited to the flowchart illustrated in FIG. 6, and the order of processes may be changed or parallelized as long as equivalent results are obtained. Initially, the receiver 101 receives wireless signals transmitted to the moving object to acquire a reception signal (S100). Next, the position management unit 102 acquires the position and velocity of the moving object (S101). Next, the search range control unit 103 acquires representative values of the Doppler frequency deviation and the delay amount based on the position and velocity of the moving object and information on the directivity of the receiving antenna (S102), and sets a range of time-frequency search space for searching the reception signal for the signals transmitted by the transmitting devices based on the representative values of the Doppler frequency deviation and the delay amount, the frequency deviation unique to the oscillator of each transmitting device, and the distances to the transmitting devices (S103).

Next, the time frequency detection unit 104 calculates the evaluation function g (τ, f) at each point within the range set by the search range control unit 103 (S104). Next, the detection unit 105 executes detection processing based on the evaluation function values obtained by the time frequency detection unit 104 and the reception signal output by the receiver 101 to generate a data string of the demodulation result (S105). Next, the error detection unit 106 performs an error check with the CRC (S106). Next, the analysis unit 107 performs data analysis to extract, from the error detection result provided by the error detection unit 106 and the data string of the demodulation result generated by the detection unit 105, position information, velocity information, and the like of the transmitting device (transmitting device information) which can be utilized by the search range control unit 103 to set a search space range (S107).

The details of the processes of S100 to S107 will be described below. S100 is a process of receiving wireless signals transmitted by the transmitter 151 and the transmitter 152. The antenna of the moving device 153 receives wireless signals transmitted by the transmitter 151 and the transmitter 152, and generates a reception signal as a data string sampled at a predetermined sampling rate. In the process of S101, information on the position and velocity of the moving object is acquired. As described above, position information and velocity information can be easily obtained by using existing techniques such as the GPS. Other types of information such as current time may be acquired in the process of S101.

Next, the process of S102 will be described. From the position information of the moving object and information on the directivity of the receiving antenna, the existence range of the transmitting devices that have transmitted the wireless signals included in the reception signal can be estimated as follows. For example, in a case where a moving object in the sky looks down on transmitting devices on the ground as illustrated in FIG. 4, it is possible to calculate a range of depression angles with respect to transmitting devices and distances to transmitting devices. By specifying a possible existence range of transmitting devices in this way, it is possible to obtain an assumed Doppler frequency deviation and an assumed propagation delay amount.

In a case where an assumed range for reception of wireless signals includes both the ground and the sea, and where it is known that transmitting devices exist only in one of them, map information can be used to exclude the Doppler frequency deviation and the delay amount corresponding to a case where wireless signals are transmitted from the place where no transmitting device exists. It should be noted that information on the directivity of the receiving antenna, map information, and the like can be simply acquired in advance.

In the process of S103, the frequency shift range assumed in the reception signal is obtained from the Doppler frequency deviation obtained in the process of S102 and information on the frequency deviation unique to the oscillator, and the range for searching the reception signal for the signal transmitted by each transmitting device is set in the time-frequency two-dimensional space using the obtained shift range and the range of the propagation delay amount obtained in the process of S102. Note that information on the frequency deviation unique to the oscillator may be information on the oscillation accuracy designed in the communication system. Alternatively, in a case where a transmitter targeted for reception is known, frequency deviation information previously used for demodulating a signal transmitted from the target device may be used as information on the frequency deviation unique to the oscillator. The TDMA method requires a reference time for time division multiplexing. In this regard, when the communication system performs time synchronization using the GPS, the reference time can be obtained with the GPS. In addition, time information can also be acquired, if necessary, simply according to the applied communication system. Other than the method that uses the GPS, a method of obtaining a reference time by receiving a signal such as a beacon transmitted at a fixed time can also be used.

Furthermore, in the process of S103, information extracted from the reception signal that is to be demodulated can be utilized for controlling the search range. For example, in the communication system in which the position information and the velocity information of a transmitting device and the identification code uniquely allocated to the transmitting device are included in the payload of a transmission frame transmitted by the transmitting device, the analysis unit 107 performs data analysis on a reception frame determined to have no error by the error detection unit 106. As a result, a set of three kinds of information is collectively stored. The three kinds of information consist of: geographical information of the transmitting device (that may include the identification code uniquely allocated to the transmitting device as well as the position information and the velocity information); synchronization information used in the demodulation of the reception frame, that is, information on the delay and frequency for synchronization obtained by the time frequency detection unit 104 in the process of S104; and geographical information of the moving object acquired by the position management unit 102 when receiving the reception frame (such as the position information, the velocity information, and the reception beam direction of the directional antenna). This makes it possible to create a database consisting of position information on both the moving object and a certain transmitting device obtained when the moving object receives a signal from the transmitting device, and time frequency information used for synchronization.

In a case where the moving object moves and receives at another time a wireless signal again with the same conditional position information, velocity information, and antenna directivity direction, past data under similar conditions are extracted from the database, so that it can be determined that reception can be performed in the vicinity of the recorded Doppler frequency, and the search range can be narrowed down based on the synchronization information.

In a case where information is sufficiently stored in the database, data from the position management unit 102 are not directly used for determination of the search range, but the search range may be indirectly set using the database that is based on the position information and the velocity information obtained from the analysis result of the data analysis unit 107, or the data from the position management unit 102 and the database may be combined for use.

In the process of S104, the evaluation function g (τ, f) is obtained, and time frequency information about the transmission signals from the plurality of transmitting devices included in the reception signal is generated from the result. A specific example of a method for this process includes using a preamble pattern that is a known sequence. Assuming that the start timing (corresponding to the delay amount) of the preamble is time variable τ and that the frequency (or frequency deviation) is frequency variable f, a pattern signal p (τ, f) is generated by changing τ and f, and a correlation characteristic between the generated pattern signal p (τ, f) and the reception signal is acquired. As a result, it is possible to obtain a correlation value between the reception signal and the pattern signal p for each of different delay amounts and frequency deviations, and each obtained correlation value becomes an element of the evaluation function g. In S104, the delay amount and frequency at which the evaluation function g gives a peak are output as time frequency information.

When obtaining the evaluation function g, it is necessary to set a step width for changing variables τ and f so as to satisfy the reception performance required by the detection unit 105 in the subsequent stage. However, because a large calculation cost is required to obtain the values of the evaluation function g for all the combinations of variable τ and variable f in a required step width, the search range is limited in the process of S103.

Ideally, a known pattern for the process of obtaining a correlation with a known sequence desirably has a single peak of autocorrelation in the delay time direction and also has a correlation characteristic that steeply attenuates from the peak position with respect to the shift in the frequency direction (it is evaluated in the form of a radar ambiguity function or the like). However, in a case where the evaluation function gently attenuates with respect to τ and f shifted from the peak due to an incomplete ambiguity function, the amount of calculation can be reduced using that property. In other words, in a case where the evaluation function g is a continuous function, and where it can be expected that the evaluation function g can give a certain magnitude even at τ and f that are somewhat away from τ and f at which a peak value is given, when the evaluation function value for certain variables τ and f is below a threshold value, it can be estimated that a large evaluation function value cannot be obtained in the vicinity thereof, and the amount of calculation can be reduced by controlling, in an appropriately coarse manner, the step width of variable τ and variable f for obtaining the evaluation function g.

This is particularly effective in a system with a widespread ambiguity function that uses alternating patterns and the like for preambles. Note that even when the amount of power reduction by replica subtraction other than the correlation characteristic is used as the evaluation function, as long as the function values outside the peak value are expected to have a characteristic in which the tail has wide-width, it is possible to reduce the amount of calculation as in the case of the correlation characteristic.

Note that it is also possible to apply a sparse coding technique such as orthogonal matching pursuit (OMP) to the evaluation function g. For example, assuming that the frame illustrated in FIG. 5 arrives at a certain time (time variable τ) with a certain frequency (frequency variable f), a replica of the preamble and the subsequent data payload portion may be generated, and the attenuation amount of the reception power obtained by subtracting the replica from the reception signal may be set as the evaluation function g (τ, f). Here, a replica of the data payload portion may be generated by performing provisional demodulation processing to obtain the transmitted sequence. Note that provisional demodulation processing may be synchronous detection performed for time τ and frequency f, or may be performed using a delay detection method or a discriminator detection method used in frequency shift keying (FSK). Alternatively, in a case where a transmitting device targeted for reception is known and the unique identification number of the device can be used, or in a case where wireless signals are received from the same area continuously in time, a replica may be generated from a reception signal successfully received in the past. In a system in which position information and the like is informed by a transmitting device, the payload does not fluctuate largely unless the transmitting device moves. Therefore, past reception data are handled in the same manner as a preamble, so that the amount of calculation for generating a replica can be reduced. In addition, in a case where a reception signal from the receiver 101 is generated at a high oversampling rate to cope with a wide frequency deviation, the reception signal includes thermal noise having power proportional to the sample rate bandwidth. In such a case, the evaluation function g (τ, f) may be obtained by performing correlation processing or replica subtraction after performing band limiting processing centering on frequency f. The signal-to-noise power ratio can be improved by band limitation, and the influence of noise on the evaluation function can be reduced.

In addition, in the case of a modulation method that uses differential encoding or the like, other processes may be performed instead of directly obtaining a transmission sequence. For example, in the case of GMSK, a replica may be generated by utilizing the characteristic of obtaining a reception constellation consisting of four candidate points such as quadrature phase shift keying (QPSK) to determine in which of the four candidate points on the signal constellation diagram the signal is located.

It should be noted that the time frequency detection unit 104 is required to output, in the process of S104, pieces of time frequency information corresponding to the number of frames included in the reception signal. In this regard, when the first piece of time frequency information is output, the time frequency detection unit 104 may subtract, from the reception signal, the corresponding replica obtained through demodulation processing (or temporary demodulation processing), generate g (τ, f) again using the subtraction result as a new reception signal, and output pieces of time frequency information for the second and subsequent frames. In the provisional demodulation processing, the contents of the data payload may be analyzed.

In the process of S105, with respect to the reception signal acquired in the process of S100, a plurality of signals included in the reception signal is demodulated based on the time frequency information obtained in the process of S104, and one or more frames transmitted from transmitting devices are acquired and output as reception frames. In the process of S105, the number of acquired reception frames is counted, and frame acquisition is performed until the number of received frames exceeds a predetermined threshold value. Note that the condition for terminating the frame acquisition is not limited to the determination based on the number of received frames. The processing may be terminated when the residual reception power obtained after interference cancellation processing performed in demodulation processing or evaluation function calculation is sufficiently smaller than the interference power coming from noise or another system.

Although synchronous detection is performed here, any existing demodulation processing may be implemented as long as it is suitable for a target communication system, such as by combining successive interference cancellation (SIC) and the maximum likelihood estimation method that is based on the Viterbi algorithm. In the case of using the SIC, interference cancellation processing may be performed only when the CRC error is not detected in S106.

The reception frame acquired in the process of S105 is handed over to the next process S106. It should be noted that information on the time and frequency used in the demodulation processing may be added to the reception frame to be handed over.

In the process of S106, an error check by the CRC is performed on the reception frame acquired in S105, and the reception frame obtained after the error check corresponding to the error check result is output to the data analysis unit 107. Here, error correction may be performed by inputting bit string data in a soft decision state to the error detection unit 106 as a reception frame and performing CRC calculation again by inverting the bits in ascending order of likelihood of soft decision at the time of error detection.

The process of S107 is performed when information that can be utilized in the process of S103 for subsequent reception signals is included in a frame (for example, in the data payload) transmitted from a transmitting device. Here, information that can be utilized in the process of S103 is the position information and the velocity information of a transmitting device, the identification code unique to a transmitting device, etc. (transmitting device information) as described above. In the process of S107, the information contained in the frame data obtained after the error check is analyzed, and the acquired transmitting device information and the time frequency information used for the demodulation of the corresponding frame are output. The frame obtained after the error check is also output as reception data. At this time, by associating the delay amount used by the detection unit 105 with the transmitting device information, it is also possible to generate information on the influence of the time slot propagation delay in a communication system in which the transmitting device uses TDMA. In a case where the moving object continues to receive signals from the same area, the receiver 101 of the moving object intermittently receives signals (frames) from the same transmitting device. In this case, it can be assumed that the delay amounts, from the time slot reference time, of a plurality of frames received from the same transmitting device are substantially the same. Therefore, in the receiving device, the amount of calculation can be reduced by calculating the evaluation function and performing the demodulation processing in the vicinity of the delay time obtained from the past reception signal with respect to the reference time for time slot determined in the same manner as in the transmitting device. Furthermore, by using the transmitting device information at the same time, it is also possible to perform a process of using the past reception signal for the replica generation described above.

As described above, according to the receiving device of the present embodiment, the time-frequency two-dimensional search space range for searching a reception signal for a plurality of superposed transmission signals is limited using the position information, the velocity information, or the like of a moving object. Therefore, even when a plurality of transmission signals unspecifically overlapping on the time or frequency axis arrives at a moving object, it is possible to efficiently extract the data transmitted by the transmitting devices while reducing the calculation cost for searching for the timing and frequency of the received transmission signals. Because computational resources can be efficiently used, it is possible to acquire more data in a short time.

In the above explanation, the time-frequency two-dimensional space is set as the search space. However, in a case where estimation of other parameters is required due to the specification of a communication method, necessary parameters may be added to the dimension of the search space. For example, when it is necessary to estimate a modulation index for the GMSK modulation method and a filter bandwidth (bandwidth time product: BT product), these values may also be added to the search space for processing. In order to reduce the computational cost, for example, initially, only the time and frequency may be narrowed down to some range using the above-described method, and then the evaluation function may be calculated with a plurality of BT products to obtain the time, frequency, and BT product at which the peak of the evaluation function is given. The above processing can prevent deterioration of the reception quality due to parameter variations in transmission signals.

Second Embodiment

Figure 7:
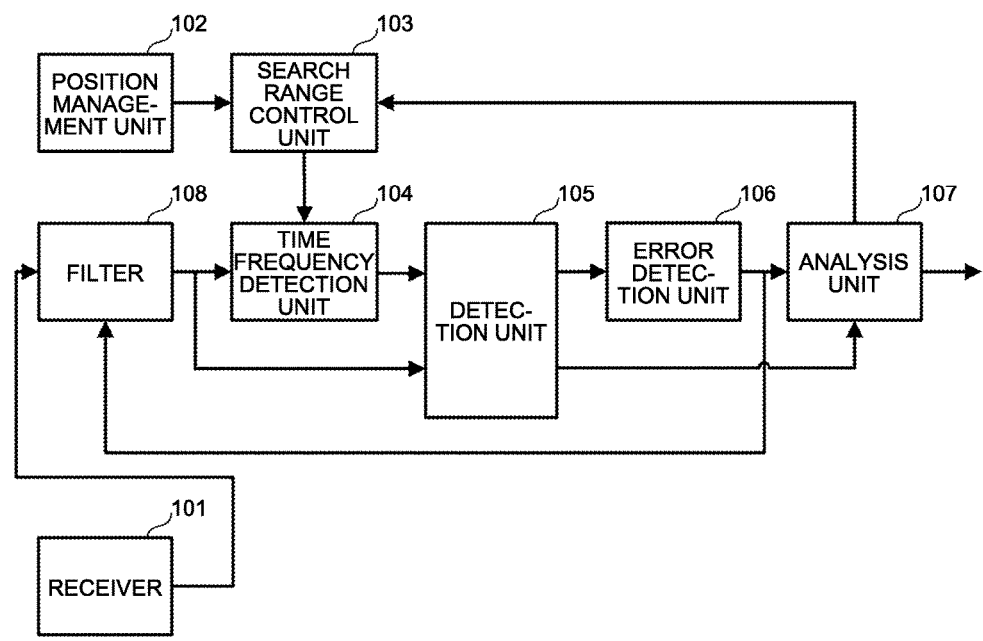
FIG. 7 is a block diagram illustrating an exemplary functional configuration of a receiving device according to a second embodiment of the present invention.

Next, an embodiment for applying the present invention to a receiving device that controls a communication area for reception by reception directivity control such as beamforming will be described. FIG. 7 is a block diagram illustrating an exemplary functional configuration of a receiving device according to the present embodiment. The functional configuration of this receiving device is different from the functional configuration of the receiving device illustrated in FIG. 1 in that a filter 108 is provided in the subsequent stage of the receiver 101 and that a frame for which no error has been detected by the error detection unit 105 is fed back to the filter 108. In the present embodiment, it is assumed that the receiver 101 includes a plurality of receiving antennas (not illustrated), acquires wireless signals in parallel by the respective receiving antennas, and outputs the acquired signals to the filter 108. The receiving device of the present embodiment can be realized by the same hardware configuration as the receiving device illustrated in FIG. 1.

Next, the operation will be described. FIG. 8 is a flowchart illustrating an exemplary processing flow of the present embodiment. The receiver 101 outputs the respective signals acquired by the plurality of receiving antennas to the filter 108 (S200). The process of S200 is the same as S100 except that processing is performed for the plurality of antennas.

The filter 108 performs beam generation processing by generating weighting coefficients (weights) for controlling, in a specific direction, the reception directivities corresponding to the plurality of signals input from the receiver 101, weighting each of the signals, and adding these signals to generate an added signal (S201). Next, when there is a normally received frame fed back from the error detection unit 105, the filter 108 performs known signal cancellation processing by generating a replica of the frame using the data string of the frame, the synchronization information (time and frequency) used at that time, and the weighting coefficient for beam generation used for demodulation, and by subtracting the replica from the added signal (S202). Then, the added signal obtained after the subtraction of the replica is input to the time frequency detection unit 104 as a reception signal. It should be noted that the process of S202 need not be executed when there is no feedback frame. In addition, in the process of S202, in a case where it is determined that the influence of the interference related to received frames is small (determined by weight coefficients), subtraction processing need not be performed.

The position management unit 102, the search range control unit 103, the time frequency detection unit 104, the detection unit 105, the error detection unit 106, and the analysis unit 107 perform demodulation processing on the reception signal input to the time frequency detection unit 104 (S203). This process S203 corresponds to the processes of S101 to S107 illustrated in FIG. 6.

After the process of S203, the filter 108 makes residual signal determination (S204). Examples of determination criteria for determining in the process of S204 that there is no residual signal include: a case where a predetermined number or more of reception signals are demodulated from a reception signal at a certain time; a case where replicas of successfully demodulated signals are generated and the replicas are subtracted from a reception signal so that the residual reception power falls below a predetermined threshold value; and no new frame is received in the most recent demodulation processing.

When it is determined in the process of S204 that there is no residual signal, the filter 108 does not generate a new added signal, and the processing is terminated. On the other hand, when there is a residual signal, another added signal is generated in the process of S201, and the processes of S203 and the subsequent step are executed again.

When performing demodulation processing while changing reception directivity using a plurality of signals received by a plurality of receiving antennas, when the receiving directivity cannot be narrowed down to a narrow area, the reception directivity is directed to an overlapping area multiple times, so that the signal of a known frame that has undergone reception processing may be mixed in an added signal. However, the known signal is canceled in the process of S202 using the time frequency information used in the demodulation processing, whereby the reception quality of an undemodulated signal can be improved.

INDUSTRIAL APPLICABILITY

As described above, the receiving device according to the present invention can generate reception data by extracting, with a small calculation cost, data included in each transmission signal from a reception signal including a plurality of incoming transmission signals overlapping in time and frequency. Therefore, the present invention can be advantageously applied to devices for processing wireless signals received by moving objects such as moving vehicles, aircrafts, and satellites.

REFERENCE SIGNS LIST 101 receiver; 102 position management unit; 103 search range control unit; 104 time frequency detection unit; 105 detection unit; 106 error detection unit; 107 analysis unit; 108 filter; 151 transmitting device; 152 transmitting device; 153 moving object; 181 preamble; 182 data payload; 183 error detection code; 201 field programmable gate array (FPGA); 202 processor; 203 memory; 301 GPS receiver.

The invention claimed is:

1. A receiving device comprising:
 a processing circuitry
 to determine, for one reception signal that is received by a moving object and includes a plurality of wireless signals partially overlapping on at least one of a time axis and a frequency axis, a search range for the plurality of wireless signals in a search space including the time axis and the frequency axis based on information on position and velocity of the moving object;
 to generate information on time and frequency at which a wireless frame included in each of the plurality of wireless signals is received in the determined search range for the reception signal; and
 to demodulate the reception signal to acquire the wireless frame based on the generated information on time and frequency.

2. The receiving device according to claim 1, wherein the processing circuitry further
 analyzes the acquired wireless frame, wherein
 the wireless frame includes position information of a transmitting device that has transmitted the wireless frame, and
 the processing circuitry stores, in association with one another, the position information of the transmitting device obtained as a result of the analysis, the information on position and velocity of the moving object at which the wireless frame corresponding to the position information of the transmitting device is received, and the information on time and frequency for demodulating the wireless frame, and determines the search range based on the stored information.

3. The receiving device according to claim 1, wherein the processing circuitry
 generates the information on time and frequency using an evaluation function including time and frequency variables, the evaluation function being set such that a function value varies continuously as the variables change, and
 adaptively controls a variation range of the time and frequency for obtaining the evaluation function according to the value of the evaluation function.

4. The receiving device according to claim 1, wherein the processing circuitry further generates a plurality of the reception signals having different reception directivities by combining signals received by a plurality of antennas through beamforming, and
 subtracts, from an added signal obtained through the beamforming, a replica generated based on the wireless frame that is obtained by demodulating any of the plurality of reception signals, and generates another one of the reception signals.

5. The receiving device according to claim 2, wherein the processing circuitry
 generates the information on time and frequency using an evaluation function including time and frequency variables, the evaluation function being set such that a function value varies continuously as the variables change, and
 adaptively controls a variation range of the time and frequency for obtaining the evaluation function according to the value of the evaluation function.

6. The receiving device according to claim 2, wherein the processing circuitry further generates a plurality of the reception signals having different reception directivities by combining signals received by a plurality of antennas through beamforming, and
 subtracts, from an added signal obtained through the beamforming, a replica generated based on the wireless frame that is obtained by demodulating any of the plurality of reception signals, and generates another one of the reception signals.

7. The receiving device according to claim 3, wherein the processing circuitry further generates a plurality of the reception signals having different reception directivities by combining signals received by a plurality of antennas through beamforming, and
 subtracts, from an added signal obtained through the beamforming, a replica generated based on the wireless frame that is obtained by demodulating any of the plurality of reception signals, and generates another one of the reception signals.

8. The receiving device according to claim 5, wherein the processing circuitry further generates a plurality of the reception signals having different reception directivities by combining signals received by a plurality of antennas through beamforming, and
 subtracts, from an added signal obtained through the beamforming, a replica generated based on the wireless frame that is obtained by demodulating any of the plurality of reception signals, and generates another one of the reception signals.

* * * * *